United States Patent [19]

Arnaldo

[11] 4,453,676
[45] Jun. 12, 1984

[54] SHREDDING MACHINE WITH WASHER AND DRIER

[76] Inventor: Farioli Arnaldo, Via Risorgimento, 40/A, Cento (Ferrara), Italy

[21] Appl. No.: 307,167

[22] Filed: Sep. 30, 1981

[30] Foreign Application Priority Data

Jan. 23, 1981 [IT] Italy .................................. 3316 A/81
May 8, 1981 [IT] Italy .................................. 3428 A/81

[51] Int. Cl.³ ........................ B02C 23/20; B02C 23/38
[52] U.S. Cl. ................................. 241/60; 241/101.2; 241/163
[58] Field of Search ..................... 241/60, 72, 74, 158, 241/160, 162, 163, 246, 247, 261, 262, 260, 101.2, 134, 152 A

[56] References Cited

U.S. PATENT DOCUMENTS

| | | | |
|---|---|---|---|
| 168,287 | 9/1875 | Reisert | 241/60 X |
| 221,543 | 11/1879 | Fleming | 241/60 |
| 525,572 | 9/1894 | Andrae | 241/60 X |
| 1,778,249 | 10/1930 | Drewer et al. | 241/60 X |
| 2,480,085 | 8/1949 | Mitchell | 241/74 |
| 3,026,786 | 3/1962 | Onarheim | 241/160 X |
| 3,233,836 | 2/1966 | Merges | 241/74 X |
| 3,254,687 | 6/1966 | Tertyshnikov | 241/160 X |
| 4,236,676 | 12/1980 | Bialski et al. | 241/74 |

Primary Examiner—Mark Rosenbaum
Attorney, Agent, or Firm—Darby & Darby

[57] ABSTRACT

A shredding machine comprises two devices placed in series, the first of which is supplied with broad pieces or sheets of synthetic resin material to be partially cleaned, cut up and shredded. The second device, supplied directly by the first, washes thoroughly and partially dries the shredded material in a first part thereof and completes the drying of the material in a second part thereof.

14 Claims, 6 Drawing Figures

SHREDDING MACHINE WITH WASHER AND DRIER

BACKGROUND OF THE INVENTION

The invention relates to a machine for cutting up, shredding and cleansing broad pieces or sheets of material and, in particular, to the machines that are employed in processes for salvaging broad pieces or sheets of plastic material such as, for example, worn sheets used to cover cultivated areas, or plastic sacks or similar, processes, that is to say, wherein the shredding of the said broad pieces or sheets and the cleansing thereof is envisaged, these operations generally being followed by others with which it is possible to reduce the shredded material to a granular state for it to then be sent to, for example, molding machines for the production of new broad pieces, sacks and/or sheets, or at any rate to be used again.

DESCRIPTION OF THE PRIOR ART

The shredding of salvaged material is presently carried out using machines that substantially comprise a barrel that is filled with the quantity of material commensurate with the capacity thereof, inside which are arranged rotating blades that operate in combination with stationary blades fixed to the said barrel.

Once the barrel has been filled and closed, movement is given to the rotating blades which, cooperating with the stationary blades, proceed with the shredding of the material contained therein.

The time the operating cycle takes is normally established by the operator, and repeated checks have to be made to ascertain the degree of the shredding of the material being processed, these often necessitating the halting of the machine and the opening of the barrel.

With known machines of the above mentioned type there are at least two operating difficulties:

the first is that it is only possible to have a succession of shredding cycles for predetermined quantities of material, which means large amounts of material and long duration processing times;

the second is the need for an operator to be constantly present to check, for each operating cycle, the degree of the shredding of the material, and not only does this clearly not allow the processing of the quantities of material in successive cycles to be uniform but it also has a noticeable effect on the cost of salvaging the said material.

SUMMARY OF THE INVENTION

The main object of the invention is, therefore, to overcome the aforementioned difficulties and, in particular, to make available a machine that is able to shred or reduce to fragments, material in the form of broad pieces or sheets (made in particular of synthetic resin) that is fed continuously thereto, and wherein the times for the processing of the material are established by the arrangement of the operating parts of the machine.

Another object of the invention is to make available a machine that is able to operate in the way outlined above and is so constructed as to allow the material being processed to be cleansed thoroughly and to have removed there from impurities, such as powdery particles and mold.

A further object of the invention is to make available a machine that is able to comply with the foregoing, is extremely simple from a construction viewpoint, and is operationally reliable as well as cheap to make.

The said objects are all attained with the machine forming the subject of the invention, which is essentially characterized by the fact that it comprises, placed in series, two devices, the first of which is designed to cut up and shred the said material, as well as to partially clean the shredded material, and the second of which is designed to wash thoroughly and to subsequently partially dry the said shredded material in the first part thereof, and then in the second part of the device to complete the drying of the said shredded material commenced in the first part.

The said first device comprises: a drum rotating inside a basket carried by a containment barrel in such a way as to form a hollow space in between the said basket and the said barrel, the said basket being provided with an inlet for the material to be processed and an outlet for the processed material, in opposite terminal areas; a device for moving the ingoing material towards the said inlet; at least a first set of cutter blades fixed to the rotating drum and so placed as to be uniformly distributed on the circumference of this in the region of the said inlet, with their cutting edges inclined with respect to the axis of the said drum in such a way as to cause the material, as it is gradually cut up, to move towards the said outlet; at least a second set of cutter blades fixed to the rotating drum, following on after the said first set of blades in such a way as to be distributed uniformly over the circumference of the said drum, with their cutting edges perpendicular to the axis of this; at least one set of beaters fixed to the rotating drum, following on after the said second set of blades, these also being distributed uniformly over the circumference of the rotating drum and inclined with respect to the axis thereof in such a way as to cause the material, as it is gradually beaten, to move towards the said outlet; first, second and third contrast elements fixed to the said basket and designed to operate in contrast with the said first and second set of blades and with the said beaters fixed to the drum; and at least one impeller, following on after the said set of beaters in the region of the outlet, fixed to the drum and able to remove the cut up and beaten material from the basket and to channel it into a connecting duct that runs into the entry point to the said second device.

The said second device comprises: a tank in which to hold a liquid, kept at a constant level, into which the said shredded material arriving from the said first device is fed; a first basket, carried by a containment barrel whose lower part opens towards the tank, oriented from the bottom upwards and provided at the bottom with an inlet, that hangs loosely in the said tank, for the admittance of the said shredded material, and at the top with an outlet, pointing downwards and externally to the said tank, through which the said shredded material isues; a first impeller, rotating in the inside of the said first basket and extending over the full axial expansion of this, constituted by a drum provided externally with a number of vanes that stretch from one extremity to the other of the said drum, the latter being constituted, going from the bottom upwards, by a cylindrical part with a solid wall and a cylindrical part with a drilled wall, the common extremities of which are positioned above the surface of the liquid contained in the said tank; a first fan whose hub is keyed to the upper journal that supports the said impeller and whose blades are enshrouded circumferentially by the drum of the said first impeller, the said blades being so oriented as to generate a flow of air directed towards the inside of the said first impeller; a second basket, carried by a second containment barrel whose lower part opens towards a container that opens upwards, oriented from the bottom upwards and provided at the bottom with an inlet for the said shredded material positioned beneath the outlet of the said first basket, and at the top with an outlet, pointing downwards, through which the said shredded material issues; a second impeller, rotating in the inside of the said second basket and extending over the full axial expansion of this, constituted by a drum defined by a cylindrical part with a drilled wall, provided externally with vanes that stretch from one extremity to the other of the said drum; and a second and a third fan whose hubs are keyed to the upper and lower journal, respectively, of the said second impeller and whose blades are enshrouded circumferentially by the drum thereof, the blades of the said second and third fan being so oriented as to generate two opposite flows of air detected towards the inside of the said second impeller.

BRIEF DESCRIPTION OF THE DRAWINGS

The characteristics of the machine forming the subject of the invention will now be rendered more clear by the description that follows of one preferred but not sole form of embodiment which is illustrated purely as an example on the accompanying drawings, in which.

DESCRIPTION OF THE PREFERRED EMBODIMENT

Figure 1:
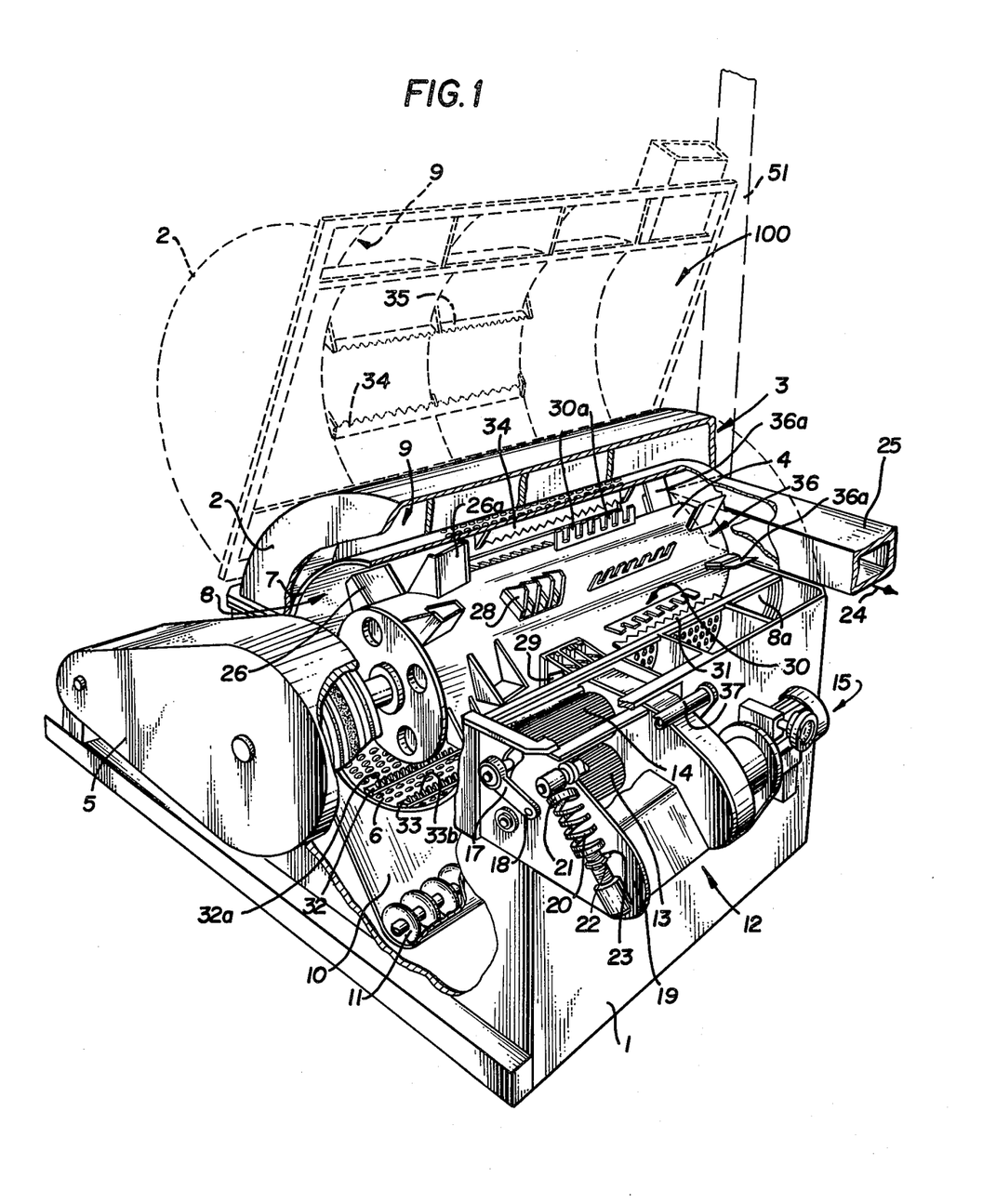
FIG. 1 shows the first device of the machine in question in a front perspective view, with certain parts in sectional form in order that others may become more apparent.
Figure 2:
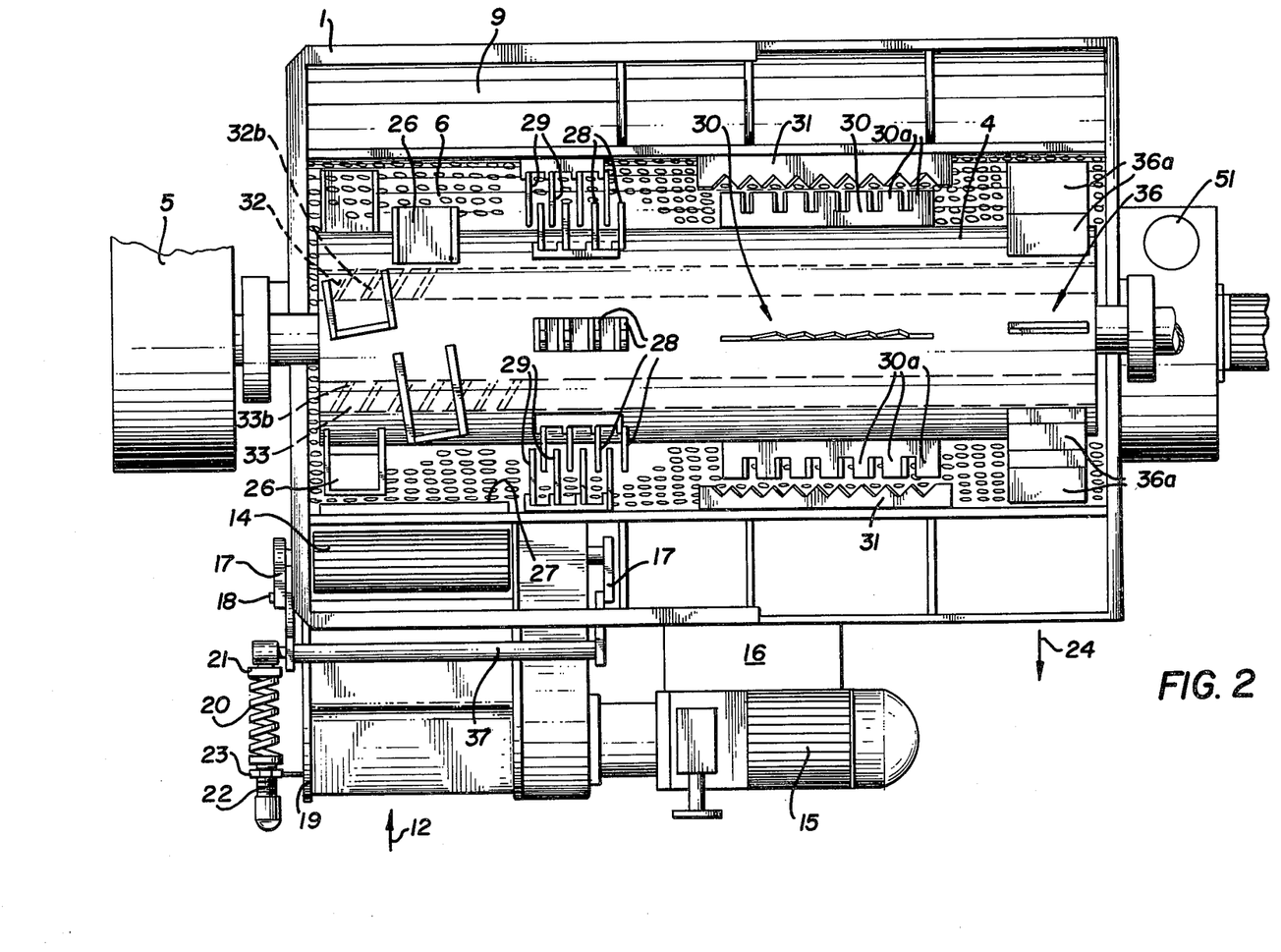
FIG. 2 shows the said first device in a plan view, seen from above.
Figure 3:
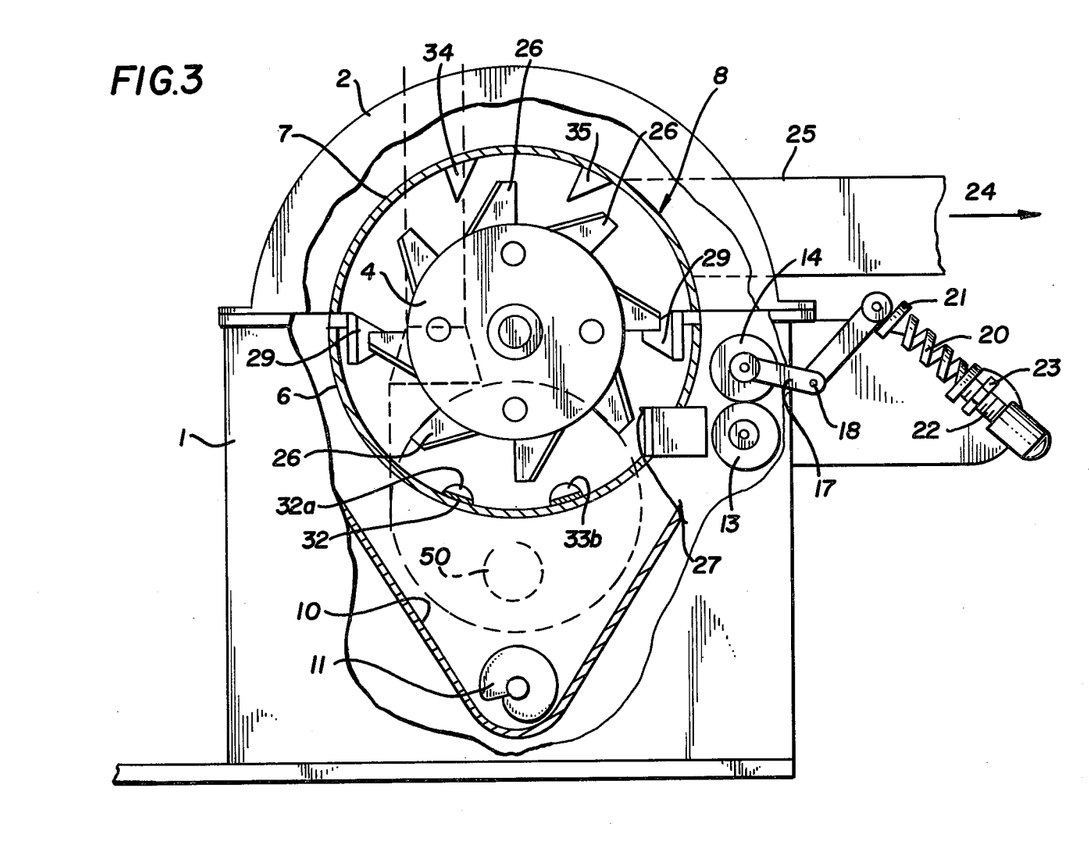
FIG. 3 shows the first device in a lateral diagrammatic view, with certain parts in sectional form in order that others may become more apparent.

With reference to FIGS. 1, 2 and 3, the first device 100 of the machine essentially comprises a base 1 to which is pivotally connected a cover 2 that forms therewith a cylindrical barrel 3 that contains a drum 4 carried by the base 1 in a way whereby it is able to rotate around a horizontal axis.

The movement of the drum 4 is taken from a motor connected mechanically to the shaft of the drum 4 via a system of pulleys and drive belts, not depicted on the drawings, housed in the casing 5. Both the base 1 and the cover 2 are provided internally with a screen, 6 and 7, respectively. The said screens 6 and 7 are constituted by a sheet of metal in which holes have been drilled, and the said screens extend so supported as to create a basket 8 to hold the material subjected to processing, as will be seen better in due course. In between the said basket 8 and the barrel 3 there is a hollow space 9 through which, as will be explained, residues and processing impurities are eliminated.

With this in mind, the lower part of the barrel 3 is shaped in the form of a hopper through which the said residues and impurities are encouraged to drop down towards a channel 10 inside which, supported by the base 1, there is an endless screw 11.

The latter can either be self-powered or be branched onto the motor that drives the drum 4, and it is able to channel everything that collects in the channel 10 towards an evacuation point, not shown on the drawings, provided in one of the sides of the base 1.

For the infeeding of the material that has to be cut up, the inside of the basket 8 has in it an inlet 12 that is made laterally in the front part of the base 1 and runs into the basket 8 at the height of the drum 4.

In the region of the said inlet 12 are placed two drive rollers 13 and 14 that move the material to be supplied to the basket 8. The roller 13 is supported by the base 1 and is carried in rotation by a variable speed motor 15, to which it is directly connected, supported by a bracket 16 fixed to the base 1, while the roller 14 is supported at the extremities of a pair of two-arm levers 17 that are articulated at 18 to a pair of walls 19 fixed to the base 1 and placed laterally with respect to the inlet 12 in such a way as to form a guide for the material being supplied towards the basket 8. The levers 17 are connected one to the other through a bar 37.

One free extremity of the levers 17 is subjected to the action of a thrust spring 20 that has one extremity housed inside a cup 21 fixed to the said terminal part of the lever 17, and the other supported by a threaded pin 22 that is provided with an operating knob and fits into a corresponding threaded hole made in a lug 23 integral with one of the said walls 19.

The action of the spring 20 determines the amount of pressure applied by the roller 14 to the material passing in between it and the roller 13, and by regulating the static load of the spring 20, by means of the threaded pin 22, it is possible to vary the value of the said pressure to suit the various requirements.

Provision is made for the cut up material to exit from the device 100 on the opposite side to that in the region of which the material going into the basket 8 passes through the inlet 12.

For this purpose, in the cover 2 there is an outlet 24 that runs into the inside of the basket 8 and, in the case in question, comprises a duct 25 designed to receive the product exiting from the basket 8 and to channel it, in a known but non-illustrated fashion, into a tank 67 provided at the entry point to a second device 200.

It is apparent from the foregoing that the device 100 is constructed in such a way that prior to reaching the outlet 24, the material supplied to the basket 8 via the inlet 12 has to pass longitudinally through the basket and, as will now be described, it is during this displacement that the material is cut up and shredded by means fixed to the drum 4 that operate in conjunction with other means fixed to the basket 8.

With particular reference to FIGS. 1 and 2, at 26 there is a first set of blades that are fixed to the drum 4 and are spaced angularly and linearly one from the other in such a way as to be distributed uniformly over the circumference of the drum 4, placed in the region of the inlet 12.

The said blades 26 operate in contrast with a stationary blade 27 that is supported by the base 1 and extends radially to the barrel 3 through an aperture made in the screen 7 until it arrives in proximity of the trajectory described by the blades 26.

The latter are arranged so that they cut the material entering the basket 8 transversely to the forward movement directrix thereof and have their respective cutting edges 26a inclined with respect to the axis of the drum 4 so as to cause the material, as it is gradually cut up, to move towards the area opposite the drum 4 where the outlet 24 is located.

At 28 there is a second set of blades fixed to the drum 4, also spaced angularly and linearly one from the other, placed downstream of the said first set of blades 26, with respect to the direction in which the material moves from the inlet 12 to the outlet 24. The blades 28 extend radially to the drum 4, are divided up into batches arranged in the form of comb teeth radially to the drum 4, and have their respective cutting edges perpendicular, or almost perpendicular, to the axis of the said drum 4.

The blades 28 are designed to cut the material being supplied to the basket 8 in the same direction in which the infeed is effected, and to do this at a time subsequent to the cutting action of the blades 26, so as to execute an orthogonal, or almost orthogonal, cutting operation in comparison with the first cutting action of the said blades 26. The blades 28 operate in contrast with two corresponding stationary blades 29 that are fixed to the basket 8, one diametrically opposed to the other, and extend radially towards the inside of the said basket 8.

At 30 there is a set of laminar elements that are fixed to the drum 4 and follow on after the second set of blades 28.

The said laminar elements 30 are also spaced angularly one from the other so as to be distributed uniformly over the circumference of the drum 4. Each of the said elements extends radially to the drum 4 and has a number of teeth 30a inclined, with respect to the axis of the said drum, in the same direction as the blades 26, in such a way as to encourage the material being processed to move forward towards the area of the basket 8 where the outlet 24 is provided.

The said laminar elements 30, or rather the teeth 30a, operate in contrast with a pair of comb type elements 31 that are fixed to the screen 7, one diametrically opposed to the other, and extend radially towards the inside of the basket 8 arriving, at the time the drum 4 is moving, in proximity of the trajectory described by the teeth 30a. The purpose of the latter is to beat the material cut up by the blades 26 and 28, in contrast with the comb elements 31, in order to cause the separation of the impurities still in contact therewith.

At 32 and 33 (see FIGS. 1, 2 and 3) there are two comb elements, placed in the lower part of the screen 7 with which the basket 8 is formed, and these extend parallel to the axis of the drum 4 over almost the full length of the said basket 8, with their teeth 32a and 33b, respectively, inclined with respect to the said axis so as to encourage the forward movement of the material along the basket 8, as will be seen better hereinafter.

At 34 and 35 (see again FIGS. 1, 2 and 3), there are two diaphragms fixed to the screen 6 that forms the basket 8, and these have the task of braking the vortical movement of the material being processed, and consequently of stimulating the cutting and beating operation of the blades 26 and 28 and of the laminar elements, respectively.

So far a description has been given of the devices with which the shredding of the material is achieved, and now consideration will be given to the piece of equipment that renders possible the expulsion of the processed material from the basket 8.

The said item is essentially constituted by an impeller 36 provided on the drum 4, at the opposite extremity thereof to that in the region of which the blades 26 are placed, and it consists of a number of vanes 36a distributed uniformly over the circumference of the drum 4. The impeller 36 is positioned in the region of the outlet 24 in such a way that as the material is collected gradually by the vanes 36a, it is thrown through the said outlet, out of the machine.

As can be clearly seen from the foregoing, the operation of the device 100 is extremely simple.

The material to be processed is fed suitably, in continuation, to the inlet 12 through the action of the drive rollers 13 and 14 until it arrives at a position in which it is subjected to the cutting action of the blades 26. This action is such that in addition to carrying in rotation the cut pieces of material, it gives them a lateral thrust towards the blades 28 which, in contrast with the stationary blades 29, subject the pieces to a further cutting operation.

The cut up material, carried in rotation by the said blades 26 and 28, is moved constantly by degrees, with the aid of the comb elements 32 and 33, towards the laminar elements 30 whose teeth 30a, in conjunction with the comb elements 31, attend to the beating of the cut up material.

All this takes place while the rotating drum 4 is revolving at a speed of approximately 600/700 revolutions per minute, and the cut up material is thus subjected to considerable centrifugal force since it is banged continuously against the walls of the basket 8.

As a result of this, all the impurities separated from the material, both during the cutting action of the blades 26 and 28, and the action of the laminar elements 30 and the comb elements 31, are thrown through the holes provided in the basket 8 into the hollow space 9, and from there they drop into the discharge channel 10 where the endless screw 11 expels them outside the machine.

During the complete displacement from the inlet 12 to the outlet 24, the material thus undergoes a succession of cutting actions and repeated beating, which allow it to be shredded perfectly and to be partially cleaned.

When the shredded and partially cleaned material arrives in the region of the outlet 24, the vanes 36a of the impeller 36 collect it from the basket 8 and throw it into the exiting duct 25 from which the processed material is withdrawn and stored or sent on to subsequent processing stations.

Should the material issuing from the machine not have been shredded to the extent desired, through an adjustment of the variable speed motor 15, in order to reduce the rotation speed of the drive rollers 13 and 14, it is possible to decrease the speed at which the material is being infed to the machine so that the blades 26 cut smaller pieces which are then thrust towards the subsequent operations.

Inside the barrel 3, at a position lower than the basket 8, is placed an aspirator 50 whose task is to draw by suction the particles projected past the said basket by the centrifugal action of the drum 4. The flow of air containing the said particles is sent into a vertical duct 51 and thence to a non-illustrated wet type filter, for the removal of the particles there from prior to being discharged towards the outside.

In order to prevent the suction action of the aspirator 50 from causing the shredded elements to form stratifications on the strip 8a on the basket 8 that enshrouds the vanes 36a of the impeller 36, the said strip has no holes in it.

Figure 4:
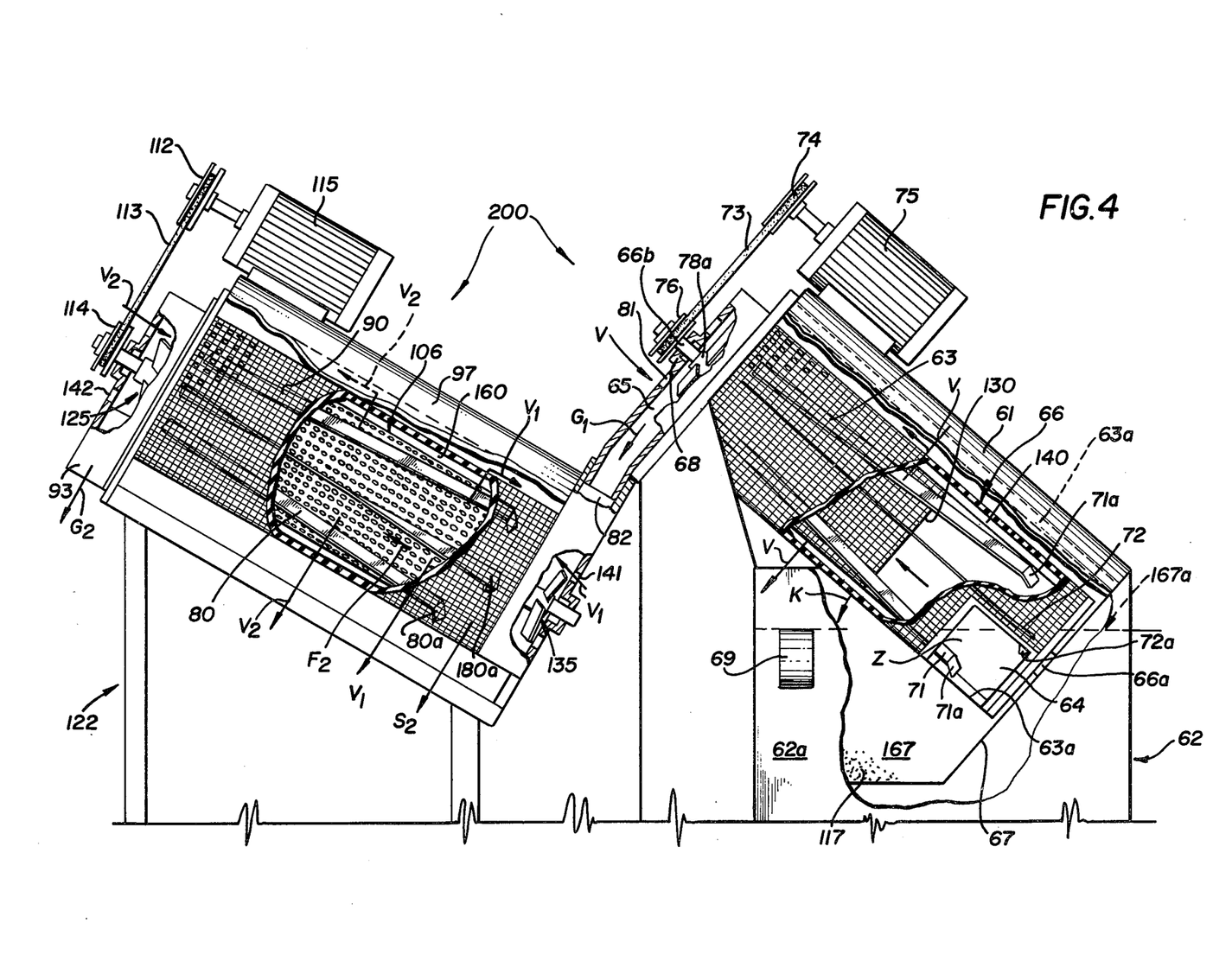
FIG. 4 shows, in a lateral view, the second device of the machine in question, with certain parts in sectional form and others removed, the purpose of this being to emphasize interesting constructional peculiarities.
Figures 5, 6:
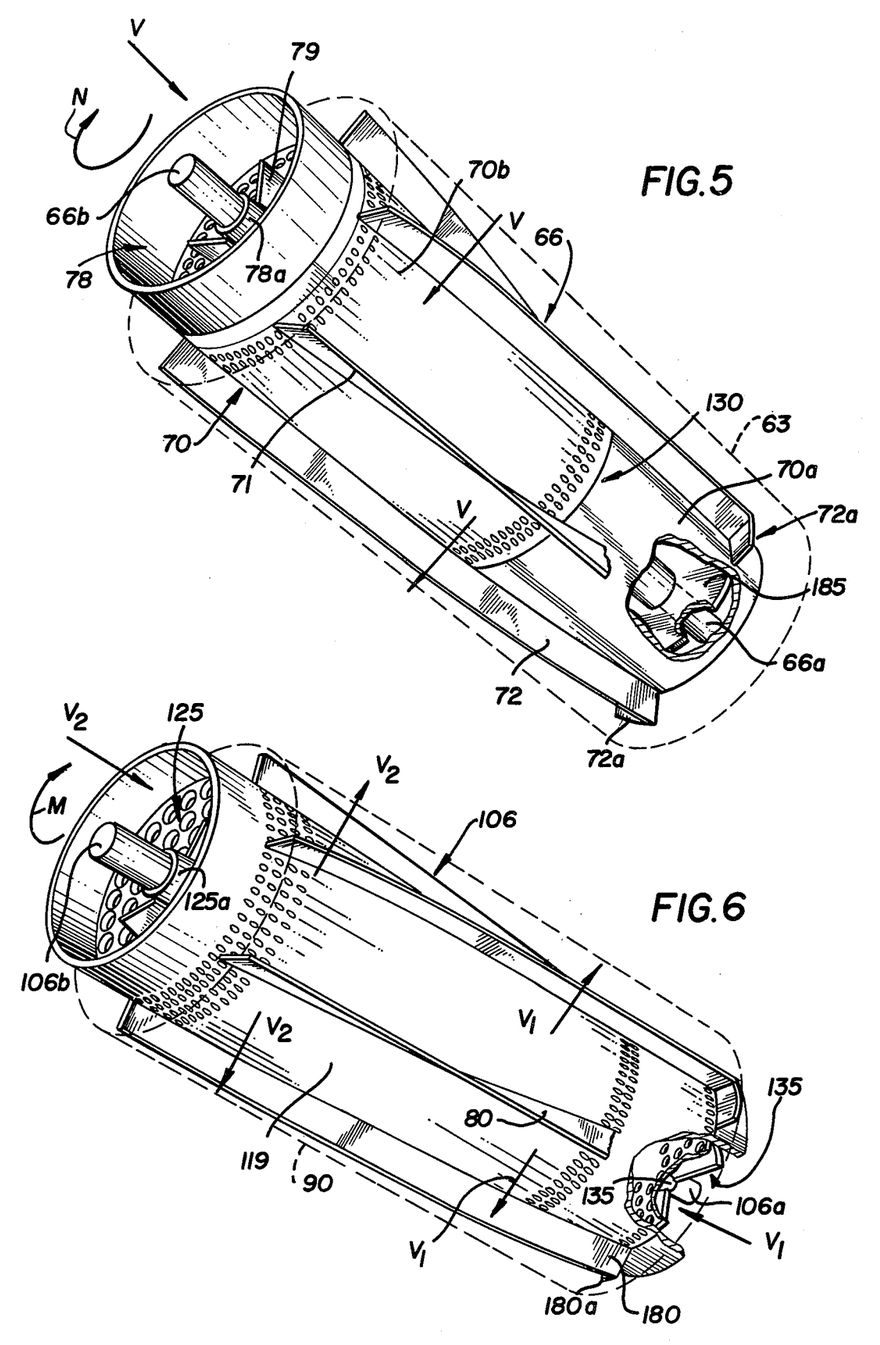
FIGS. 5 and 6 show, in two perspective views, the two impellers with which the said second device is provided, and the corresponding baskets (shown with dashes), with certain parts removed in each case in order that others may become more apparent.

With reference to FIGS. 4, 5 and 6, at 200 there is a second device, the supporting structure of which, shown at 62, has a box shaped lower part 62a inside which is provided a tank 67 that contains a suitable washing liquid 167, the surface 167a of which is kept at a predetermined level by means of a spillway 69.

To the structure 62 are fixed bars 63a that are parallel one with the other and are positioned circumferentially, inclined from the bottom upwards (FIG. 4). In a position inside the bars 63a is fixed a basket 63 (or first basket), and this is provided at the bottom with an inlet 64 (that hangs loosely in the tank 67) and at the top with an outlet 65 pointing downwards.

The basket 63 is enshrouded by a containment barrel 61, fixed in a known fashion to the structure 62, and the lower part of this opens towards the tank 67. Revolving inside the basket 63 there is an impeller 66 (or first impeller) that extends over the full length of the said basket, and the journals of this, namely 66a and 66b, are rotatably supported by bearings 68 carried by the structure 62.

The drum 70 of the impeller 66 is made in two parts, 70a and 70b, the former being a solid wall and the latter, a drilled wall. The line 130 that separates the parts 70a and 70b is positioned above the surface 167a of the liquid 167.

The impeller 66 is completed by a plurality of vanes, shown alternately at 71 and 72, that are fixed externally to the drum 70 and are of a pitch notably greater than the length of the said drum 70.

The extremities 71a and 72a of the said vanes that point towards the inlet 64 are bent on the same side as the rotation direction N of the impeller 66 and originate at different distances with respect to the relevant extremity of the drum 70. To be more precise, the extremities 71a orginate in a more internal position than the extremities 72a, and the advantages derived from this particular form of construction will be explained below.

The drive in the direction N of the impeller 66 is provided by an electric motor 75 (fixed to the top of the barrel 61) which, through a pulley 74 and a belt 73, carries in rotation a pulley 76 fixedly mounted on the journal 66b of the impeller 66.

Keyed to the said journal 66b is the hub 78a of a fan 78 whose blades are contained in the inside of the drum 70 and fixed thereto by means of welding.

When the impeller 66 rotates in the direction N, the fan 78 creates a flow V of air drawn in from the outside via holes 81 in the barrel 61, and directed axially towards the inside of the impeller 66.

The outlet 65 of the basket 63 runs into the inlet 82 (pointed upwards) of a basket 90 (or second basket) which, similarly to what has been stated in respect of the basket 63, is supported by a structure 122 and is enshrouded by a containment barrel 91 that opens downwards. The basket 90 is provided with an outlet 93 pointed downwards.

Revolving inside the basket 90 there is an impeller 106 (or second impeller) whose journals 106a and 106b are supported rotatably by the structure 122 similarly to what has been said in regard to the journals 66a and 66b of the impeller 66.

The impeller 106 is constituted by a drilled wall drum 119 and by vanes 80 and 180 (similarly to the vanes 71 and 72 of the impeller 66), the extremities 80a and 180a of which point towards the inlet 82, and are constructed in the same way as the extremities 71a and 72a of the vanes 71 and 72.

The drive in the direction M of the impeller 106 is provided by an electric motor 115 with the interposition of transmission means 112, 113 and 114.

To the said journals 106a and 106b are keyed the hubs 135a and 125a of the fans 135 and 125, respectively, the blades of which are contained in the inside of the drum 119 and fixed thereto by means of welding.

When the impeller 106 rotates in the direction M, the fans 135 and 125 create the flows $V_1$ and $v_2$ of air drawn in from the outside via the holes 141 and 142 in the barrel 91, and directed axially, in opposite directions, towards the inside of the impeller 106.

A description now follows of the operation of the apparatus in question.

The shredded material, or shredded synthetic resin products 117 coming from the exiting channel 25 of the first device 100, goes into the tank 67 in which a mixture is constituted by the liquid 167 and by the shredded products 117.

Because of the rotation of the impeller 66 in the direction N, the said mixture is drawn by suction from the tank 67 across the inlet 64 and into the hollow space 140 that exists in between the basket 63 and the drum 70 (direction $F_1$).

The said suction action is encouraged by the bent extremities 71a and 72a of the vanes 71 and 72 integral with the drum 70, and by the areas Z defined by the fact that the extremities 71a are positioned further inside than the adjacent end of the drum 70 since they constitute means of enticement for the said mixture.

In the said hollow space 140, the said mixture is subjected, through the action of the vanes 71 and 72, to being banged energetically against the inside wall of the basket 63, and this is due both to the centrifugal force (derived from the rotation of the impeller in the direction N) and from the axial component (direction $F_1$) derived from the particular conformation of the vanes. The shredded products 117 are, in this way, vigorously washed.

Once past the height of the surface 167a, the said mixture, drawn by the vanes along the said hollow space 140, starts to lose water since this is thrown (direction K), on account of the centrifugal force, through the holes in the basket 63 for it to drop back into the tank 67.

The said mixture (by now practically devoid of water) is hit, once past the line 130 separating the parts 70a and 70b, in diametrical planes by the flow V created by the fan 78. Since the extremity of the drum 70 of the impeller 66 pertinent to the journal 66a is sealed with a disk 185, the said flow V is, in fact, obliged to flow out of the holes in the part 70b and to hit the shredded products 117 along diametrical planes, after which it is expelled externally from the basket. This contributes, jointly with the aforementioned centrifugal effect, to the drying of the said shredded products 117.

When the latter are discharged from the impeller 66 into the outlet 65 (from which they are channelled by gravity (direction $G_1$) into the inlet 82 of the basket 90), they are devoid completely of dirt and mold (in other words they are washed perfectly) and are almost dry.

The complete drying of the said shredded products 117 is performed in the hollow space 160 defined between the basket 90 and the drum 119 of the impeller 106. In the said hollow space, the said products are banged energetically against the inner wall of the basket 90 (on account of the rotation of the impeller 106 in the direction M) and are contemporaneously carried upwards (direction $F_2$) by the vanes 80 and 180 of the impeller 106. The centrifugal action to which the products 117 are subjected removes any eventual residual drop of water from them (the said drops being eliminated radially in direction $S_2$), though the determining effect for drying completely the said products is that they are hit (along diametrical planes) first of all by the flow $V_1$ and then by the flow $V_2$ caused by the fans 135 and 125, respectively.

It thus ensues from the foregoing that when the shredded products 117 are discharged by the impeller 106 into the outlet 93 (from which, dropping down in the direction $G_2$, they are carried away in suitable non illustrated containers or conveyors), they are both perfectly clean and perfectly dry.

In brief, the device 200, through the two basket-impeller groups, 63–66 and 90–106, first of all washes and then subsequently dries (with everything being done in an optimum fashion) the shredded products 117. More exactly, the first of the above mentioned groups washes and partially dries the shredded products 117, while the second group completes the drying operation.

It is understood that the foregoing has been described purely as an unlimited example and, therefore, that modifications to the constructional details may be made without this, in any way, constituting a deviation from the technical solution seen above and claimed hereunder.

What is claimed is:

1. Machine for cutting up and shredding broad pieces of material, made particularly of synthetic resin, and for subsequently washing and drying said shredded material, characterized by the fact that the machine comprises, placed in series, two devices, one of which cuts up and shreds said material, and the second of which washes thoroughly and subsequently partially dries said shredded material in a first part thereof, and then in a second part of the second device completes the drying of said shredded material commenced in the first part, wherein said one device comprises: a drum rotating inside a basket carried by a containment barrel in such a way as to form a hollow space in between said basket and said barrel, said basket being provided with an inlet for the material to be processed and an outlet for the processed material, in opposite terminal areas; a device for moving the ingoing material towards said inlet; at least a first set of cutter blades fixed to the rotating drum and so placed as to be uniformly distributed over the circumference thereof in the region of said inlet, with their cutting edges inclined with respect to the axis of said drum in such a way as to cause the material, as it is gradually cut up, to move towards said outlet; at least a second set of cutter blades fixed to the rotating drum, following on after said first set of blades in such a way as to be distributed over the circumference of said drum, with their cutting edges perpendicular to the axis thereof; at least one set of beaters fixed to the rotating drum, following on after said second set of blades, these also being distributed uniformly over the circumference of the rotating drum and inclined with respect to the axis thereof in such a way as to cause the material, as it is gradually beaten, to move towards said outlet; first, second and third contrast elements fixed to said basket and designed to operate in contrast with said first and second set of blades and with said beaters fixed to the drum; and at least one impeller, following on after said set of beaters in the region of the outlet, fixed to the drum and able to remove the cut up and beaten material from the basket and to channel it into a connecting duct that runs into the entry point to said second device.

2. Machine according to claim 1 wherein said second device comprises: a tank in which to hold a liquid, kept at a constant level, into which said shredded material arriving from said first device is fed; a first basket, carried by a containment barrel whose lower part opens towards the tank, oriented from the bottom upwards and provided at the bottom with an inlet, that hangs loosely in said tank, for the admittance of said shredded material, and at the top with an outlet, pointing downwards and externally to said tank, through which said shredded material issues; a first impeller, rotating in the inside of said first basket and extending over the full axial expansion thereof, constituted by a drum provided externally with a number of vanes that stretch from one extremity to the other of said drum, the drum being constituted, from the bottom upwards, by a cylindrical part with a solid wall and a cylindrical part with a drilled wall, having common extremities which are positioned above the surface of the liquid contained in said tank; a first fan whose hub is keyed to the upper journal that supports said impeller and whose blades are enshrouded circumferentially by the drum of said first impeller; a second basket, carried by a second containment barrel whose lower part opens towards a container that opens upwards, oriented from the bottom upwards and provided at the bottom with an inlet for said shredded material positioned beneath the outlet of said first basket, and at the top with an outlet, pointing downwards, through which said shredded material issues; a second impeller, rotating in the inside of said second basket and extending over the full axial expansion thereof, constituted by a second drum defined by a cylindrical part with a drilled wall, provided externally with vanes that stretch from one extremity to the other of said second drum; and a second and a third fan whose hubs are keyed to the upper and lower journal, respectively, of said second impeller and whose blades are enshrouded circumferentially by said second drum thereof, the blades of said second and third fan being so oriented as to generate two opposite flows of air directed towards the inside of said second impeller.

3. Apparatus according to claim 2, wherein a disk is provided to seal the extremity of the first impeller that is unaffected by said first fan.

4. Apparatus according to claim 2, wherein the pitch of said first and second impellers is greater than their axial length.

5. Apparatus according to claim 4, wherein the extremities of said vanes, in the region of the shredded material inlets of the respective baskets, are bent in the direction of rotation of the impellers concerned.

6. Apparatus according to claim 5, wherein the bent extremities of said vanes originate alternately in an internal position with respect to the bent extremities of the remainder of the vanes.

7. Apparatus according to claim 2, wherein the cylindrical strips that enshroud circumferentially the blades of said first, second and third fan, are of the solid wall type.

8. Apparatus according to claim 2, wherein the blades of said first, second and third fan are, at the outside extremity thereof, integral with the respective cylindrical strips on the corresponding drums that enshroud them.

9. Machine according to claim 1, wherein said drum extends horizontally and the lower part thereof is shaped in the form of a hopper that defines a collection channel extending over the full length of the barrel, inside which are placed endless screw means for the evacuation of particles that drop down from said basket at the time the material being processed is cut and beaten.

10. Machine according to claim 9, wherein provision is made for at least one comb element placed in the region of the lower part of the basket and stretching over almost the full length of this, the teeth of the comb element being inclined with respect to the axis of the rotating drum in such a way as to encourage the material cut, beaten and placed in movement in the inside of the basket by said first and second set of cutter blades and by said beaters, to move forward from said inlet towards said outlet.

11. Machine according to claim 9 or 10, wherein provision is made for at least one diaphragm fixed to the basket and extending over almost the full length of this in such a way as to be outside the trajectory described by said first and second sets of cutter blades and by said beaters, and to obstruct the vortical movement of the material carried in rotation by them in the inside of the basket.

12. Machine according to claim 1, wherein below the basket, the barrel is provided with an aspirator.

13. Machine according to, claim 12, further comprising a strip on the basket that enshrouds the vanes of the impeller, said strip being of the solid wall type.

14. Machine according to claim 1, wherein said device for moving the ingoing material comprises a pair of counter-rotating rollers, one of which is supported in such a way as to be subjected to the action of a spring that tends to keep said roller pressed up against the other roller, the said spring being subjected to the action of means for regulating its static load.

* * * * *